United States Patent [19]

Bliek et al.

[11] Patent Number: 5,738,777
[45] Date of Patent: Apr. 14, 1998

[54] METHOD OF ELECTROCHEMICALLY MACHINING WORKPIECES

[75] Inventors: Marinus Bliek; Maarten Brussee, both of Drachten, Netherlands

[73] Assignee: U.S. Philips Corporation, New York, N.Y.

[21] Appl. No.: 745,760

[22] Filed: Nov. 8, 1996

[30] Foreign Application Priority Data

Nov. 8, 1995 [EP] European Pat. Off. ............ 95203032

[51] Int. Cl.[6] .................................................. B23H 9/14
[52] U.S. Cl. .................................. 205/665; 204/290 R
[58] Field of Search .................... 205/665; 204/224 M, 204/225, 290 R

[56] References Cited

U.S. PATENT DOCUMENTS

| | | | |
|---|---|---|---|
| 3,196,093 | 7/1965 | Williams | 205/665 |
| 3,383,296 | 5/1968 | Trager | 205/665 |
| 3,386,907 | 6/1968 | Abt | 204/225 X |
| 3,421,997 | 1/1969 | Williams | 204/224 M |
| 3,749,654 | 7/1973 | Mikulski | 204/224 M |
| 4,705,615 | 11/1987 | Hoffmann | 204/224 M |

FOREIGN PATENT DOCUMENTS 4002400  8/1990  Germany.

OTHER PUBLICATIONS

"Ultrastructure Processing of Advanced Ceramics", H. Schmidt et al., 1988, John Wiley & Sons, pp. 651–660.

*Primary Examiner*—Donald R. Valentine
*Attorney, Agent, or Firm*—Ernestine C. Bartlett

[57] ABSTRACT

The invention relates to a method of providing one or more through-holes in a metal workpiece by means of an electrochemical machining apparatus (ECM apparatus). Said method is characterized in that the surface of the workpiece from which the electrode of the ECM apparatus emerges is provided with an auxiliary layer, which comprises a polymeric network composed of organic and inorganic fragments. In this manner, rounding at the boundary between the holes formed and the exit surface of the ECM electrode is precluded. A polymeric network comprising silicon oxide and zirconium oxide as well as carbon-containing fragments, which are incorporated in the polymeric network via SiC bonds, are preferred.

The invention can very advantageously be used to manufacture shaving foils and shaving combs.

22 Claims, 2 Drawing Sheets

METHOD OF ELECTROCHEMICALLY MACHINING WORKPIECES

FIELD OF THE INVENTION

The invention relates to a method of forming one or more through-holes in a metal workpiece by means of an electrochemical machining apparatus (ECM apparatus). The invention also relates to a workpiece manufactured in accordance with said method.

BACKGROUND OF THE INVENTION

A method of the type mentioned in the opening paragraph is disclosed, for example, in DE 40.02.700. As described in said Patent document, electrochemical machining (hereinafter referred to as ECM) of workpieces takes place in an electrolyte solution having a high ionic strength. In said process, the workpiece to be machined serves as the anode and the electrode of the ECM apparatus as the cathode. During electrochemical machining, an electric current runs between the anode and the cathode. Under these conditions, the electrode senses as a shaping tool. The workpiece, which serves as the anode, dissolves locally, for example in the form of metal hydroxide(s), while hydrogen is formed at the electrode surface. This electrochemical machining method enables (patterns of) arbitrarily shaped holes to be formed in a metal workpiece in a relatively simple and accurate manner.

Said known method has an important drawback. If said method is employed, the edges formed by the through-holes at the location of the surface of the workpiece where the electrode leaves said workpiece exhibit roundings. The radius of rounding generally exceeds 20 micrometers. This radius is defined as the radius of the best fitting circle in the rounding, taken in a sectional view through the hole at right angles to the exit surface. For various applications of the workpiece, radii of rounding of such magnitude are undesirable, in particular, if the edge formed is to be used as a cutting face. This is the case, for example, if the finished workpiece must be used as a shaving foil or shaving comb for a shaver.

SUMMARY OF THE INVENTION

It is an object of the invention, inter alia, to obviate the above drawback. The invention more particularly aims to provide a method of electrochemically forming one or more holes in a workpiece, in such a manner that the edges around the holes formed in the machining operation do not, or hardly, have roundings. The radius of rounding of the holes formed by the method in accordance with the invention should be smaller than 15 micrometers, preferably smaller than 10 micrometers.

These and other objects of the invention are achieved by a method of providing one or more throug-holes in a metal workpiece by means of an electrochemical machining apparatus (ECM apparatus), which method is characterized in accordance with the invention in that the surface of the workpiece from which the electrode of the ECM apparatus emerges is provided with an auxiliary layer, which comprises a polymeric network which is composed of organic and inorganic fragments.

By virtue of said auxiliary layer on the exit surface of the workpiece, the formation of the undesirable rounding on the edges between the holes formed in the workpiece and the exit surface is precluded. Any roundings will be situated in the auxiliary layer. Said layer serves as a kind of sacrificial layer, which, if desired, can be removed after the holes have been formed. The measure in accordance with the invention enables roundings to be formed whose radius is smaller than 10 micrometers, in particular smaller than 5 micrometers.

For the auxiliary layer use can be made, in principle, of different types of materials. For example, sacrificial plates of metal or a synthetic resin can be used. However, this would limit the freedom of design of the workpiece. In the case of workpieces of which the exit surface has a more or less irregular shape, the use of sacrificial plates is very expensive. Moreover, a good adhesion of the auxiliary layer to the workpiece was found to be necessary. Despite the use of said type of auxiliary layers, insufficient adhesion leads to rounding at the edges of the holes formed in the workpiece. In the case of irregularly shaped exit surfaces, the adhesion of the auxiliary layer may be problematic. To overcome these drawbacks, the auxiliary layer must comprise a polymeric network which is composed of organic and inorganic fragments.

Materials consisting of said polymeric networks are commonly referred to as "combined inorganic/organic materials" (hereinafter referred to as CIMAT). These materials have the advantage that they can be provided in the form of a layer by means of wet-chemical deposition techniques in a relatively simple manner. For this reason, they can suitably be used as an auxiliary layer on workpieces having a more or less irregular exit surface. It has been found that layers of this type have a relatively high hardness, a great chemical inertness as well as a satisfactory toughness and flexibility. In general, these types of materials adhere very strongly to metal surfaces. By virtue thereof, rounding of the workpiece at the edge of the holes formed occurs hardly, if at all.

A preferred variant of the method in accordance with the invention is characterized in that the polymeric network comprises silicon oxide and zirconium oxide as well as carbon-containing fragments, which are incorporated in the polymeric network via SiC bonds.

It has been found that the presence of Si and Zr enables auxiliary layers of excellent quality to be obtained. The presence in the network of a specific quantity of zirconium oxide, in addition to silicon oxide, increases the resistance of the auxiliary layer to electrolyte liquids. In addition, zirconium oxide improves the mechanical properties, such as hardness, abrasion resistance and scratch resistance, of the layer.

CIOMAT compounds are based on a hybrid inorganic-organic network which comprises, apart from an inorganic network of silicon oxide and zirconium oxide, a carbon-containing polymeric component. Specific C atoms of said polymer are chemically bonded to Si atoms of the inorganic network. The polymeric chains are intertwined with the inorganic network and together they constitute a hybrid inorganic-organic network. Examples of polymeric components include polyether, polyacrylate and polyvinyl. Such a layer of a hybrid material is known per se from an article by H. Schmidt et. al., in "Ultrastructure Processing of Advanced Ceramics" (1988), John Wiley & Sons, pp. 651–660. The layer described therein is used as a scratch-resistant protective layer for synthetic-resin lenses.

It has been found that the ratio between the quantities of Si and Zr in the polymeric network are important to obtain an auxiliary layer having optimum mechanical properties. To this end, the auxiliary layer preferably comprises 1 to 50 mol. % of zirconium oxide relative to silicon oxide. Below 1 mol. %, the favorable effect occurs insufficiently, whereas above 50 mol. % no further improvement occurs and the layer becomes unnecessarily expensive. Better results are achieved if the layer comprises 5 to 35 mol. % of zirconium oxide relative to silicon oxide.

It is noted that the auxiliary layer, as described in the preceding paragraph, is manufactured by means of a sol-gel process in which an aqueous solution of an alkoxysilane compound and an alkoxy zirconium compound is provided on the workpiece and converted to the desired auxiliary layer at an elevated temperature. In addition to water and an organic solvent, said solution comprises the following constituents:

a trialkoxysilane of the formula:

$$(RO)_3Si\text{---}R^1$$

wherein R is a $C_1$–$C_5$ alkyl group and $R^1$ is a polymerizable group, and $R^1$ is chemically bonded to the Si-atom via an Si—C bond, and a tetraalkoxyzirconate of the formula:

$$Zr(OR)_4$$

wherein R has the above-mentioned meaning. This solution is used to form an auxiliary layer composed of an inorganic network of silicon oxide and zirconium oxide as well as of a polymer formed from the polymerizable group $R^1$. This polymer is chemically bonded to and intertwined with the inorganic network via Si—C bonds.

The sol-gel process is based on homogeneous hydrolysis and polycondensation of silicon alkoxide and zirconium alkoxide in the presence of water. A three-dimensional inorganic network is formed by using trialkoxysilanes and zirconium alkoxide. The group R is a $C_1$–$C_5$ alkyl group. Said trialkoxysilane also comprises a polymerizable group $R^1$ which is chemically bonded to the Si—atom via an Si—C bond. The polymerizable groups $R^1$ form polymeric chains which are chemically bonded to the inorganic network via Si—C bonds. The polymeric chains are chemically bonded to and intertwined with the inorganic network. This results in mechanically strong and thermally stable auxiliary layers.

Examples of suitable polymerizable groups $R^1$ are epoxy, methacryloxy and vinyl groups. The epoxy groups, methacryloxy groups and vinyl groups polymerize into, respectively, a polyether, a polymethacrylate and a polyvinyl. The epoxy groups can be polymerized thermally; for this purpose, an amine compound may optionally be added to the solution as a catalyst. To polymerize the other groups, the layer must be irradiated with UV light.

Suitable trialkoxysilanes comprising polymerizable groups $R^1$ are, for example, 3-glycidoxy propyl-trimethoxysilane, 3-methacryloxy propyl-trimethoxysilane and vinyl triethoxysilane.

Examples of suitable tetraalkoxy zirconates are tetrabutoxy zirconates $Zr(OC_4H_9)_4$ (TBOZ) and tetrapropoxy zirconate $Zr(OC_3H_7)_4$ (TPOZ).

The solution comprises 1 to 50 mol. %, preferably 5 to 35 mol.%, of the zirconium-alkoxy compound relative to the other alkoxy compounds. The zirconium oxide is incorporated in the network by hydrolysis and condensation. By virtue thereof, the above-mentioned advantages regarding chemical and mechanical stability of the auxiliary layer are achieved. In addition, the stability of the sol-gel solution is improved by adding the above-mentioned zirconium-alkoxy compound.

The solution may also comprise 0.01 to 10 mol. %, relative to the alkoxy compounds, of an aminoalkoxysilane such as 3-aminopropyl-triethoxysilane, or other amine compounds such as trimethylamine. These amine compounds serve as a catalyst for the thermal polymerization of the epoxy groups.

In addition to water for the hydrolysis reaction, the solution comprises one or more organic solvents such as ethanol, butanol, isopropanol and diacetone alcohol.

The solution can be provided on the workpiece by means of customary methods such as spinning, spraying or atomizing. The shape and the dimensions of the surface of the workpiece to be coated also determine which one of said methods is chosen. It has been found that by drop-wise applying the solution onto the workpiece, a satisfactory result is achieved. The drops spread easily on the surface of a metal workpiece to form a layer of uniform thickness. After drying and heating, for example, to 160° C. for 30 minutes, a dense, insulating auxiliary layer which adheres well to the workpiece is obtained in this manner. Good results can also be obtained by locally exposing the liquid layer to light.

The thickness of tile auxiliary layer of a hybrid inorganic-organic material preferably ranges from 2 to 10 micrometers. At thicknesses below 2 micrometers, the inventive effect on the reduction of rounding is insufficient. If tile thickness exceeds 10 micrometers, the flexibility of the auxiliary layer becomes too small. Under these conditions, electrochemical machining of, in particular, relatively thin workpieces may lead to the formation of crackles in the layer. This may cause the auxiliary layer to peel locally from the workpiece. A good compromise between both effects is achieved if the auxiliary layer has a thickness in the range from 2–5 micrometers.

To improve the chemical resistance of the auxiliary layer, optionally, up to 40 mol. % (relative to the other alkoxy compounds) of an alkoxysilane comprising a non-polymerizable group, such as an alkyl trialkoxysilane or an aryl trialkoxysilane, is added to the solution. As a result of this addition, an improved adhesion of the auxiliary layer to the metal workpiece is obtained. The alkoxy groups and the alkyl groups comprise 1 to 5 C atoms. A suitable aryl trialkoxysilane is, for example, phenyl trimethoxysilane.

It is optionally possible to replace a small part of all of the above-mentioned trialkoxysilane compounds by the corresponding dialkoxysilane compounds. Dialkoxysilane compounds themselves do not lead to a three-dimensional inorganic network but to linear polysiloxane chains. In this case, the organic fragments ensure that these inorganic chains are combined to form a three-dimensional network. The hardness of the auxiliary layer thus obtained will be slightly smaller than that of the above-mentioned layers.

In accordance with further advantageous embodiment of the invention, the auxiliary layer is mechanically removed, preferably by grinding or scouring, after the hole or holes are provided.

Experiments have led to the recognition that various types of metal workpieces can very advantageously be manufactured by means of the method in accordance with the invention. The method proved to be suitable, in particular, for the manufacture of shaving foils and shaving combs. In this type of workpiece, the presence of a sharp cutting edge (i.e. a small radius of rounding) around the holes formed is very important. In principle, all metals and metal alloys which can be machined electrochemically can be used as the material for the workpiece. Metal alloys of the chromium-steel type proved to be very suitable. Chromium steel preferably contains about 13 wt. % Cr.

These and other aspects of the invention will be apparent from and elucidated with reference to the embodiments described hereinafter.

Figure 1A:
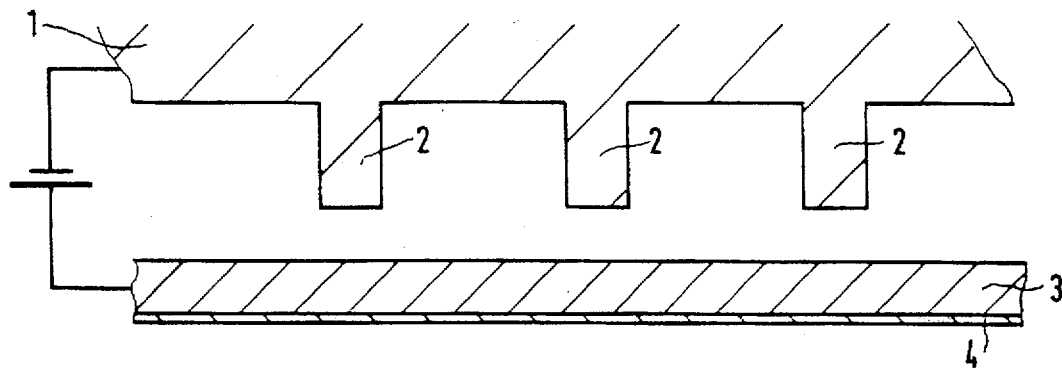
FIGS. 1(A–D) schematically shows a number of steps of the method in accordance with the invention.
Figure 1B:
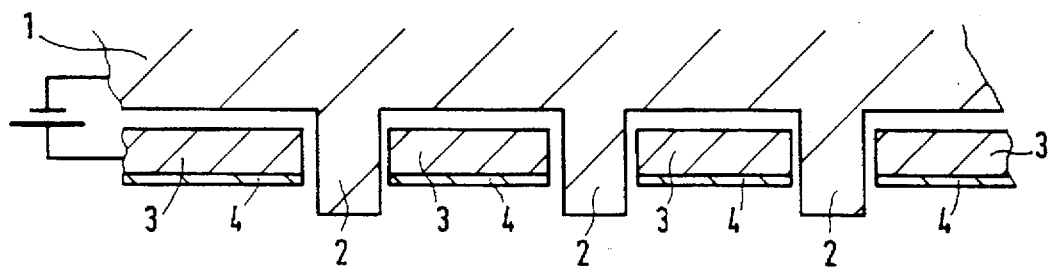
Figure 1C:
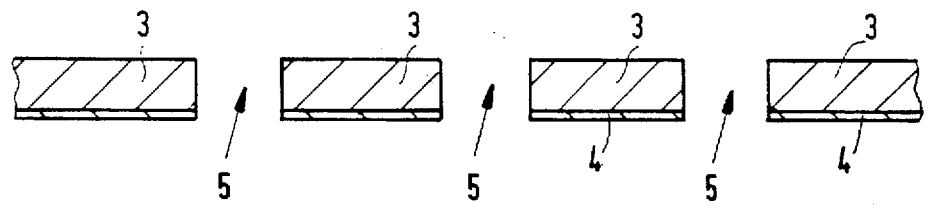
Figure 1D:
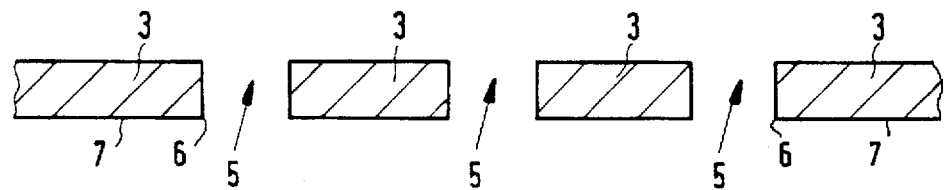

It is noted that, for clarity, the parts are not drawn to scale.

DETAILED DESCRIPTION OF THE PREFERRED EMBODIMENTS

FIGS. 1(A–D) schematically and in cross-section shows four process steps (A–D) of the method in accordance with the invention. Reference numeral 1 denotes a part of the electrode of an ECM apparatus (not shown in detail). This electrode comprises three sub-electrodes 2, which may have any shape. Said sub-electrodes are directed towards a metal workpiece 3, which is made, for example, of chromium steel. The surface of the workpiece facing away from the ECM electrode is provided with an auxiliary layer 4. Said layer comprises a polymeric network composed of organic and inorganic fragments.

During electrochemical machining, the sub-electrodes 2 and the workpiece 3 are situated in a solution having a high ionic strength. A voltage is applied between the electrodes and the workpiece, so that the electrode serves as the cathode and the workpiece as the anode.

The electrode and the workpiece are moved together from the position shown in FIG. 1-A. In this process, throughholes, whose shape corresponds to that of the sub-electrodes (see FIG. 1-B), are formed in the workpiece. After the holes have been formed, the electrode is withdrawn (FIG. 1-C). If necessary, the auxiliary layer 4 then is mechanically removed, for example by means of scouring. This results in the workpiece shown in FIG. 1-D. By means of visual inspection it has been established that the edges 6 at the holes formed and at the exit surface 7 of the workpiece do not, or hardly, exhibit rounding. If use is made of the measure in accordance with the invention, the radius of rounding is less than 10 micrometers. In the absence of the auxiliary layer 4, a substantial degree of rounding occurs at the edges 6 during the ECM process. In this case, the radius of rounding exceeds 20 micrometers.

As stated hereinabove, the auxiliary layer should comprise a polymeric network which is composed of organic and inorganic fragments. Polymeric networks which are very suitable in this respect comprise silicon oxide and zirconium oxide as well as carbon-containing polymeric fragments, which are incorporated in the polymeric network via SiC bonds, with the auxiliary layer preferably containing 1 to 50 mol. %, more preferably containing 5 to 35 mol. % zirconium oxide relative to silicon oxide.

The auxiliary layer can be provided on the workpiece from a solution. To this end, first a solution A is prepared comprising 20 g PhTMS (phenyl trimethoxysilane, 0.10 mol.), 154 g GLYMO (3-glycidoxypropyl-trimethoxysilane; 0.65 mol.), 57 g isopropanol (0.95 mol.) and 36 g water (2.0 mol.). This solution A is mixed with solution B comprising 29 g isopropanol (0.48 mol.), 20 g ethylacetoacetate (0.15 mol.) and 69 g tetrabutoxy zirconate ($Zr(BuO)_4$; 0.15 mol.). This mixture is stirred intensively.

To this mixture, in succession, the following components are slowly added: 11 g water (0.6 mol.), 11 g AMEO (3-aminopropyl-triethoxysilane; 0.05 mol.), 18 g water (1.0 mol.) and 87 g DAE (diacetone alcohol; 0.74 mol. in which 32 g of the epoxy resin DER330 are dissolved). The mixture thus formed is filtered off and stored in a cool place. This mixture comprises alkoxy compounds in the following molar percentages:

10 mol. % phenyl trimethoxysilane 65 mol. % 3-glycidoxypropyl-trimethoxysilane 5 mol. % 3-aminopropyl-triethoxysilane 20 mol. % tetrabutoxy zirconate.

The phenyl trimethoxysilane, 3-glycidoxypropyl-trimethoxysilane, tetrabutoxy zirconate and 3-aminopropyl-triethoxysilane form the precursors which are used, together with water, to build up the inorganic-organic network. Ethyl acetoacetate functions as a complexing agent to reduce the reactivity of tetrabutoxy zirconate relative to the water used. Isopropanol and diacetone alcohol are used as the solvent. After providing the solution, for example by drop-wise applying the solution onto the workpiece, the layer obtained is converted into a polymeric network comprising inorganic and organic fragments by curing the layer at 160° C. for 30 minutes.

Auxiliary layers manufactured in accordance with the formula described in the preceding paragraph were found to adhere well to the surface of metal workpieces. Further experiments revealed that some variation in the quantities of said precursors does not render the adhesive layer useless. For example, it has been found that the final mixture must comprise the following quantities of these precursors:

40 to 90 mol. % 3-glycidoxypropyl-trimethoxysilane 1 to 50 mol. % tetrabutoxy zirconate 0.01 to 10 mol. % 3-aminopropyl-triethoxysilane 0 to 30 mol. % phenyl trimethoxysilane.

It has been found that if the quantity of one or more precursors in a mixture is not within the ranges given above, the resultant auxiliary layer will generally not meet the requirements. In such a case, the adhesion of the auxiliary layer to the workpiece is often found to be sub-optimal.

Figure 2:
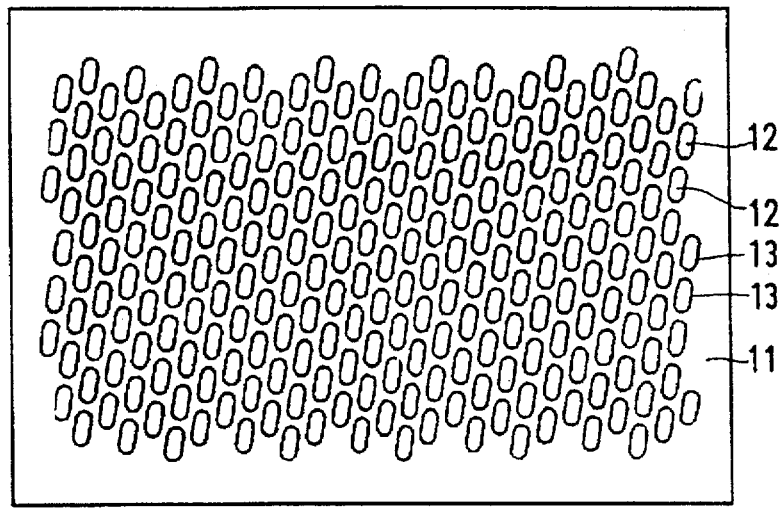
FIG. 2 shows a finished shaving foil, which is manufactured by means of the method in accordance with the invention.

FIG. 2 shows a shaving foil which can be manufactured very advantageously by means of the method in accordance with the invention. Said shaving foil comprises a flat, rectangular foil 11 of a flexible metal in which a pattern of hair-entry apertures 12 is provided in the form of oval through moles. This pattern is provided by means of electrochemical machining, in which the electrode of the ECM apparatus comprises a regular pattern of oval sub-electrodes.

When the pattern of holes was formed, the foil was provided, on the exit surface, with an auxiliary layer of the above-described polymeric network of organic and inorganic fragments. In this manner, it is achieved that the edges 13 forming the boundary between the holes and the exit surface are hardly rounded. If said shaving foil is used in a shaver, a cutter system presses on this exit surface. When the shaver is in operation, said cutter system moves past the foil, so that the edges 13 serve as cutting edges for the cutter system. Consequently, these edges should exhibit rounding which is as small as possible. Measuring data and fitting data showed that the average radius of rounding of said edges was less than 5 micrometers.

Figure 3:
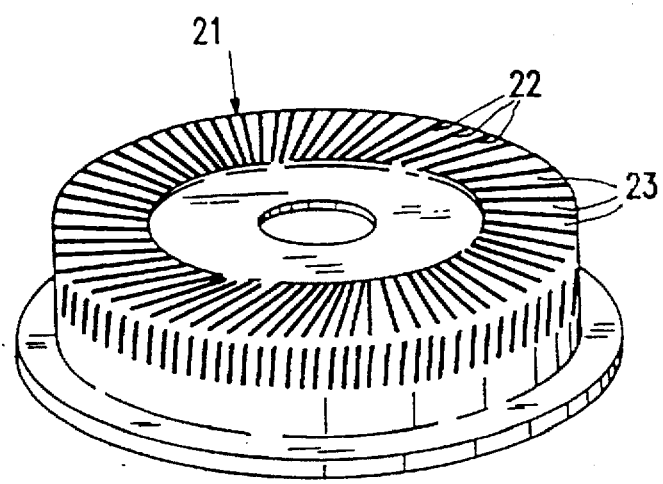
FIG. 3 shows a finished shaving comb manufactured by means of the method in accordance with the invention.

FIG. 3 shows a shaving comb which can be manufactured very advantageously by means of the method in accordance with the invention. Said shaving comb comprises a substantially flat, circular wall portion 21 of a metal. Said wall portion is provided with a pattern of grooves 22 which, in a radial sectional view, are U-shaped, said grooves being provided by means of the method in accordance with the invention. These grooves 22 divide a substantial part of the wall portion into lamellae 23.

When the grooves are provided by means of an ECM operation, the inside surface of wall portion 21 is provided with an auxiliary layer of the above-described polymeric network of organic and inorganic fragments. In this manner, it is achieved that the edges which form the boundary between the grooves 22 and said inside surface are hardly rounded. When this shaving comb is used in a shaver, a cutter system presses on this inside surface. When this shaver is in operation, this cutter system rotates past the wall portion 21, so that said edges serve as the cutting edges of the cutter system. Consequently, these edges should exhibit hardly any rounding. In the last case, the auxiliary layer can be removed in a simple manner due to wear-in of the cutter system relative to the auxiliary layer. Measuring data and fitting data have shown that the average radius of rounding of said edges is less than 5 micrometers.

This invention relates to a method of providing one or more through-holes in a metal workpiece, such as shaving foils or shaving combs, by means of an electrochemical machining apparatus (ECM apparatus). To this end, the method is characterized in that the surface of the workpiece from which the electrode of the ECM apparatus emerges is provided with an auxiliary layer comprising a polymeric network composed of organic and inorganic fragments. In this manner, rounding at the boundary between the holes formed and the exit surface of the ECM electrode is reduced to a substantial degree. A polymeric network comprising silicon oxide and zirconium oxide as well as carbon-containing fragments, which are incorporated in the polymeric network via SiC bonds, proved to be very favorable.

We claim:

1. A method of providing one or more through-holes in a metal workpiece by means of an electrochemical machining apparatus wherein the surface of the workpiece from which the electrode of the electrochemical machining apparatus emerges has an auxiliary layer attached thereto, which auxiliary layer comprises a polymeric network which is composed of organic and inorganic fragments.

2. A method as claimed in claim 1 wherein the auxiliary layer is mechanically removed after the hole or holes are provided.

3. A method as claimed in claim 2, wherein a shaving comb is the workpiece.

4. A method as claimed in claim 2, wherein a shaving foil is the workpiece.

5. A metal workpiece manufactured as claimed in claim 1 wherein said workpiece is made of chromium steel.

6. A method of providing one or more through-holes in a metal workpiece by means of an electrochemical machining apparatus wherein the surface of the workpiece from which the electrode of the electrochemical machining apparatus emerges is provided with an auxiliary layer, which comprises a polymeric network which is composed of organic and inorganic fragments, and wherein the polymeric network comprises silicon oxide and zirconium oxide as well as carbon-containing fragments, which are incorporated in the polymeric network via SiC bonds.

7. A method as claimed in claim 6, wherein the auxiliary layer comprises 5 to 35 mol. % zirconium oxide relative to silicon oxide.

8. A method as claimed in claim 7, wherein the auxiliary layer is mechanically removed after the hole or holes are provided.

9. A method as claimed in claim 7, wherein a shaving comb is the workpiece.

10. A method as claimed in claim 7, wherein a shaving foil is the workpiece.

11. A method as claimed in claim 6, wherein the auxiliary layer is mechanically removed after the hole or holes are provided.

12. A method as claimed in claim 6, wherein a shaving comb is the workpiece.

13. A method as claimed in claim 6, wherein a shaving foil is the workpiece.

14. A method as claimed in claim 6, wherein a shaving comb is the workpiece.

15. A method of providing one or more through-holes in a metal workpiece which comprises a shaving foil by means of an electrochemical machining apparatus wherein the surface of the workpiece from which the electrode of the electrochemical machining apparatus emerges is provided with an auxiliary layer, which comprises a polymeric network which is composed of organic and inorganic fragments.

16. A method of providing one or more through-holes in a metal workpiece which comprises a shaving comb by means of an electrochemical machining apparatus wherein the surface of the workpiece from which the electrode of the electrochemical machining apparatus emerges is provided with an auxiliary layer, which comprises a polymeric network which is composed of organic and inorganic fragments.

17. A method of providing one or more through-holes in a metal workpiece by means of an electrochemical machining apparatus wherein the surface of the workpiece from which the electrode of the electrochemical machining apparatus emerges is provided with an auxiliary layer, which comprises a polymeric network which is composed of organic and inorganic fragments and which is derived from a mixture of precursor compounds comprising 40 to 90 mol. % 3-glycidoxypropyl-trimethoxysilane, 1 to 50 mol. % tetrabutoxy zirconate, 0.01 to 10 mol. % 3-aminopropyl-triethoxysilane, and 0 to 30 mol. % phenyl trimethoxysilane.

18. A method as claimed in claim 17, wherein the auxiliary layer is mechanically removed after the hole or holes are provided.

19. A method as claimed in claim 18, wherein a shaving comb is the workpiece.

20. A method as claimed in claim 18, wherein a shaving foil is the workpiece.

21. A method as claimed in claim 17, wherein a shaving comb is the workpiece.

22. A method as claimed in claim 17, wherein a shaving foil is the workpiece.

* * * * *